(12) United States Patent
Feuerstraeter

(10) Patent No.: US 7,243,154 B2
(45) Date of Patent: Jul. 10, 2007

(54) DYNAMICALLY ADAPTABLE COMMUNICATIONS PROCESSOR ARCHITECTURE AND ASSOCIATED METHODS

(75) Inventor: Mark T. Feuerstraeter, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 10/186,028

(22) Filed: Jun. 27, 2002

(65) Prior Publication Data

US 2004/0003100 A1    Jan. 1, 2004

(51) Int. Cl.
G06F 15/16    (2006.01)

(52) U.S. Cl. .............. 709/230; 709/236; 370/255

(58) Field of Classification Search .......... 709/230, 709/217, 225, 231, 203, 204, 245, 224, 219, 709/222, 253, 227, 250, 220, 236; 710/19, 710/14, 15, 107, 34; 370/524, 358, 236, 370/459, 335, 389, 230, 252, 395, 392, 390, 370/255, 352
See application file for complete search history.

(56) References Cited

U.S. PATENT DOCUMENTS

| | | | | |
|---|---|---|---|---|
| 4,003,033 A | * | 1/1977 | O'Keefe et al. ............ 710/107 |
| 4,713,806 A | * | 12/1987 | Oberlander et al. ........ 370/358 |
| 5,202,964 A | * | 4/1993 | Crouch ........................ 710/19 |
| 5,490,252 A | * | 2/1996 | Macera et al. ............... 709/249 |
| 5,581,790 A | * | 12/1996 | Sefidvash .................... 710/34 |
| 5,699,350 A | * | 12/1997 | Kraslavsky .................. 370/254 |
| 5,726,984 A | * | 3/1998 | Kubler et al. ............... 370/349 |
| 5,828,655 A | * | 10/1998 | Moura et al. ................ 370/236 |
| 5,926,501 A | * | 7/1999 | Souissi et al. .............. 375/131 |
| 5,954,796 A | * | 9/1999 | McCarty et al. ............ 709/222 |
| 6,049,826 A | * | 4/2000 | Beser ........................ 709/222 |
| 6,108,350 A | * | 8/2000 | Araujo et al. ............... 370/467 |
| 6,118,796 A | * | 9/2000 | Best et al. ................... 370/524 |
| 6,145,024 A | * | 11/2000 | Maezawa et al. ............ 710/14 |
| 6,151,632 A | * | 11/2000 | Chaddha et al. ............ 709/231 |
| 6,219,706 B1 | * | 4/2001 | Fan et al. ................... 709/225 |
| 6,236,647 B1 | * | 5/2001 | Amalfitano ................. 370/335 |
| 6,237,029 B1 | * | 5/2001 | Master et al. ............... 709/217 |
| 6,295,532 B1 | * | 9/2001 | Hawkinson ................... 707/4 |
| 6,343,313 B1 | * | 1/2002 | Salesky et al. ............ 709/204 |
| 6,347,091 B1 | * | 2/2002 | Wallentin et al. ........... 370/437 |
| 6,351,469 B1 | * | 2/2002 | Otani et al. ................ 370/459 |
| 6,356,951 B1 | * | 3/2002 | Gentry, Jr. .................. 709/250 |
| 6,377,578 B1 | * | 4/2002 | Waller ...................... 370/395.1 |
| 6,381,227 B1 | * | 4/2002 | Fielding et al. ............. 370/321 |

(Continued)

OTHER PUBLICATIONS

Dynamically Adaptable Software with Metacomputations in a..—Harrison, Sheard (2001) cse.cse.ogi.edu/PacSoft/publications/2001/harrison-sheard.pdf.*

(Continued)

*Primary Examiner*—Thong Vu
(74) *Attorney, Agent, or Firm*—Blakely, Sokoloff, Taylor & Zafman LLP

(57) ABSTRACT

A dynamically adaptable communications processor includes a memory element, which includes executable content, and a control element, coupled with the memory element, that selectively implements the executable content to modify the dynamically adaptable communications processor to process data based, at least in part, on a type of communication channel from which the data is received.

16 Claims, 5 Drawing Sheets

U.S. PATENT DOCUMENTS

| | | | |
|---|---|---|---|
| 6,466,986 B1* | 10/2002 | Sawyer et al. | 709/245 |
| 6,571,291 B1* | 5/2003 | Chow | 709/230 |
| 6,640,101 B1* | 10/2003 | Daniel | 455/423 |
| 6,640,239 B1* | 10/2003 | Gidwani | 709/203 |
| 6,647,428 B1* | 11/2003 | Bannai et al. | 709/245 |
| 6,651,099 B1* | 11/2003 | Dietz et al. | 709/224 |
| 6,687,765 B2* | 2/2004 | Surugucchi et al. | 710/15 |
| 6,691,192 B2* | 2/2004 | Ajanovic et al. | 710/107 |
| 6,760,772 B2* | 7/2004 | Zou et al. | 709/230 |
| 6,834,298 B1* | 12/2004 | Singer et al. | 709/220 |
| 6,839,349 B2* | 1/2005 | Ambe et al. | 370/390 |
| 6,842,429 B1* | 1/2005 | Shridhar et al. | 370/252 |
| 6,842,454 B2* | 1/2005 | Metcalf, III | 370/392 |
| 6,850,521 B1* | 2/2005 | Kadambi et al. | 370/389 |
| 6,888,830 B1* | 5/2005 | Snyder, II et al. | 370/392 |
| 6,934,756 B2* | 8/2005 | Maes | 709/227 |
| 6,975,597 B1* | 12/2005 | Baker et al. | 370/255 |
| 7,099,584 B1* | 8/2006 | Narvaez et al. | 398/58 |
| 2001/0047434 A1* | 11/2001 | Liu | 709/253 |
| 2002/0083190 A1* | 6/2002 | Kamiya et al. | 709/236 |
| 2002/0152305 A1* | 10/2002 | Jackson et al. | 709/224 |
| 2002/0176418 A1* | 11/2002 | Hunt et al. | 370/389 |
| 2003/0039234 A1* | 2/2003 | Sharma et al. | 370/338 |
| 2003/0063562 A1* | 4/2003 | Sarkinen et al. | 370/230 |
| 2003/0120799 A1* | 6/2003 | Lahav et al. | 709/236 |
| 2003/0208561 A1* | 11/2003 | Hoang et al. | 709/219 |
| 2003/0227906 A1* | 12/2003 | Hallman | 370/352 |

OTHER PUBLICATIONS

An Approach for Constructing Dynamically Adaptable..—Amano, Watanabe (1999) ; www.jaist.ac.jp/~n-amano/paper017.ps.gz.*

An Analysis of the Timed Z-channel—Moskowitz, Greenwald, Kang (1996) www.itd.nrl.navy.mil/ITD/5540/publications/CHACS/1996/1996greenwald-oakland.ps.*

The Eden Coordination Model for Distributed Memory..—Breitinger, Loogen.. (1997) dalila.sip.ucm.es/funcional/publicaciones/hips97full.ps.*

On the Management of Compositions of Web Services—Tosic, Pagurek, Esfandiari.. (2001) www.research.ibm.com/people/b/bth/OOWS2001/tosic.pdf.*

An Approach for Constructing Dynamically Adaptable..—Amano, Watanabe (1999) www.jaist.ac.jp/~n-amano/paper017.ps.gz.*

Autonomy and Decentralization in Active Networks: A Case..—Ingo Busse Stefan (1999) user.cs.tu-berlin.de/~alalalal/privat/job/bang/iwan99.ps.*

The K-Component Architecture Meta-Model for Self-Adaptive..—Dowling, Cahill (2001) ftp.cs.tcd.ie/pub/tech-reports/reports.01/TCD-CS-2001-50.pdf.*

Towards Semantics of Self-Adaptive Software—Pavlovic (2000) ftp.kestrel.edu/pub/papers/pavlovic/SSAS.ps.gz.*

Mobility and Security Management, pp. 434-498; GSM system for Mobile Communications, LAssay-Chateaux, FR 1993.*

CRC-16 polynomials optimized for applications using self-synchronous scramblers; Gorshe, S.S.; Communications, 2002. ICC 2002. IEEE International Conference on vol. 5, Apr. 28-May 2, 2002 pp. 2791-2795 vol. 5.*

Data transport applications using GFP; Scholten, M.; Zhenyu Zhu; Hernandez-Valencia, E.; Hawkins, J.; Communications Magazine, IEEE; vol. 40, Issue 5, May 2002 pp. 96-103.*

Transparent generic framing procedure (GFP): a protocol for efficient transport of block-coded data through SONET/SDH networks; Gorshe, S.S.; Wilson, T.; Communications Magazine, IEEE; vol. 40, Issue 5, May 2002 pp. 88-95.*

A Malis, et al., "PPP over SONET/SDH," Network Working Group, Request for Comments: 2615, Obsoletes:1619, Category: Standards Track, DayDreamer, Jun. 1999.

W. Simpson, "PPP in HDLC-like Framing," Network Working Group, Request for Comments: 1662, STD: 51, Obsoletes: 1549, Category: Standard Track, Daydreamer, Jul. 1994.

* cited by examiner

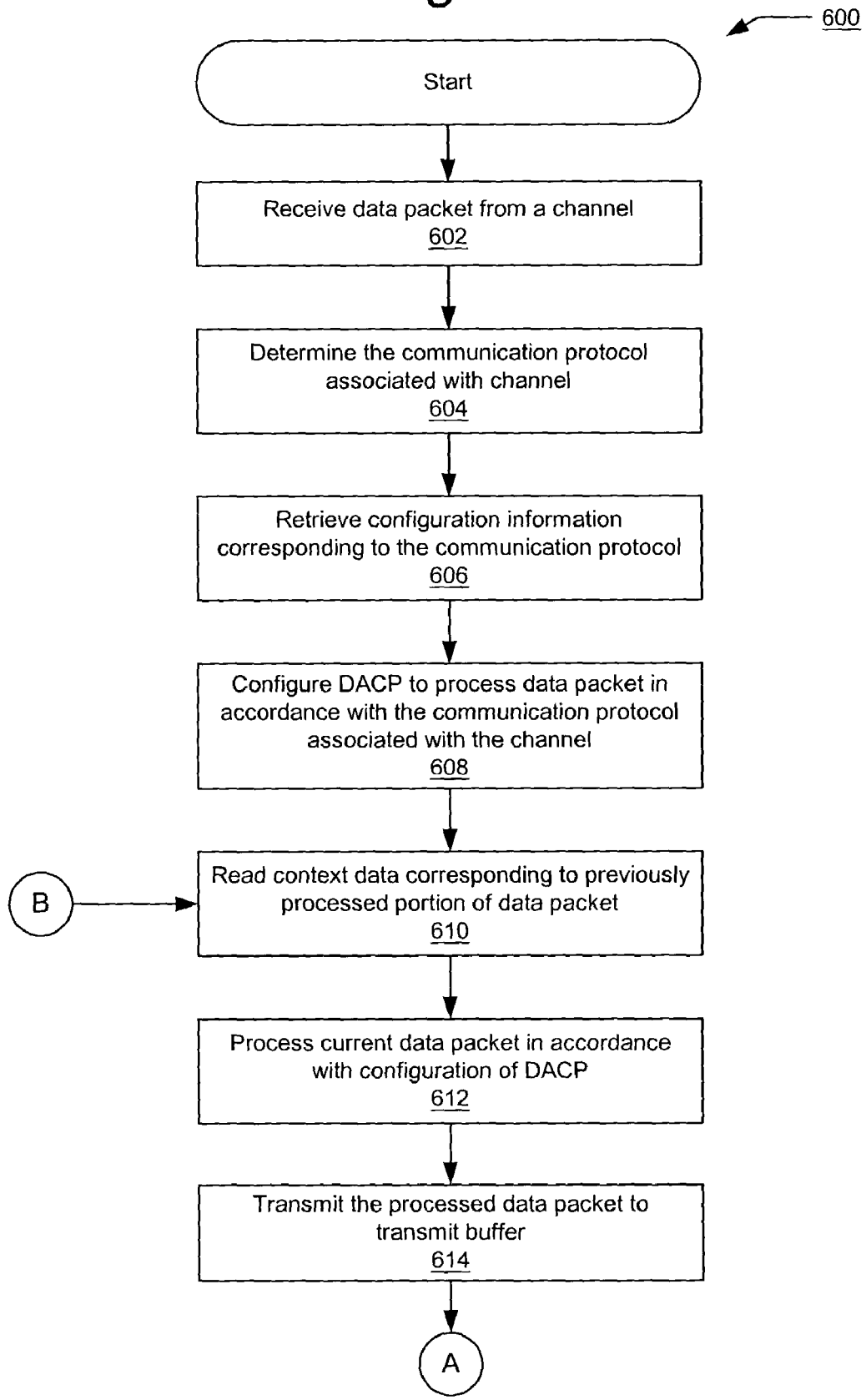

DYNAMICALLY ADAPTABLE COMMUNICATIONS PROCESSOR ARCHITECTURE AND ASSOCIATED METHODS

TECHNICAL FIELD

Embodiments of the invention are generally related to the field of data networking and, in particular, to a dynamically adaptable communications processor and associated methods.

BACKGROUND

Data networking is a term colloquially applied to any architecture wherein electronic devices (e.g., computer systems, communication devices) are communicatively coupled to one another through a network architecture. The network architecture is typically comprised of a number of network devices, e.g., routers, switches, and hubs, which serve to route data packets (sometimes colloquially referred to as datagrams) between electronic devices.

Those skilled in the art will appreciate that there are many different types of networks and an associated number of communication protocols through which such devices communicate. Typically, a network device is designed to operate in one of the number of networking environments and, in this regard, will include a communications processor dedicated to processing data packets in accordance with a single communication protocol. With the acceptance and proliferation of multiple network types and associated protocols, it has become desirable to create a network device that functions in multiple network architectures and, in this regard, with multiple network protocols.

A conventional approach to such multi-network networking devices generally requires that the network device be endowed with multiple communications processors, i.e., one each for each of the communication protocols to be supported by the network device. Employing multiple communication devices within such a network device can, however, greatly increase the cost of the network device. Moreover, such a solution, which is fundamentally based in hardware, is not extensible to accommodate future network architectures and/or communication protocols.

Another, more recent, approach to such a multi-network networking device is to fabricate a communications processor with the circuitry necessary to support a predetermined number of communication protocols. Again, such an approach is rather costly, as the fabricated device does not really reduce the amount of circuitry necessary to support the pre-determined number of communication protocols, but merely integrates it within a single package. Moreover, as above, inasmuch as the solution is fundamentally based on hardware, it is not extensible to accommodate newly developed networking architectures or communication protocols.

BRIEF DESCRIPTION OF THE DRAWINGS

Embodiments of the invention are illustrated by way of example, and not by way of limitation, in the figures of the accompanying drawings in which like reference numerals refer to similar elements and in which:

FIG. 6 and FIG. 7 are a flow chart illustrating one example embodiment of a method of a communications processor dynamically adapting to any of a plurality of different communication protocols, in accordance with the teachings of an embodiment of the invention;

DETAILED DESCRIPTION

A dynamically adaptable communications processor (DACP) and associated methods are described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

According to one aspect of the invention, the DACP dynamically reconfigures itself to process data packets in accordance with any of a number of communication protocols. In this regard, a host device integrated with the DACP may well be used in any of a number of disparate network architectures. Moreover, the DACP is extensible to support communication protocols and network architectures not yet developed.

Example Operating Environment and Network Device

Figure 1:
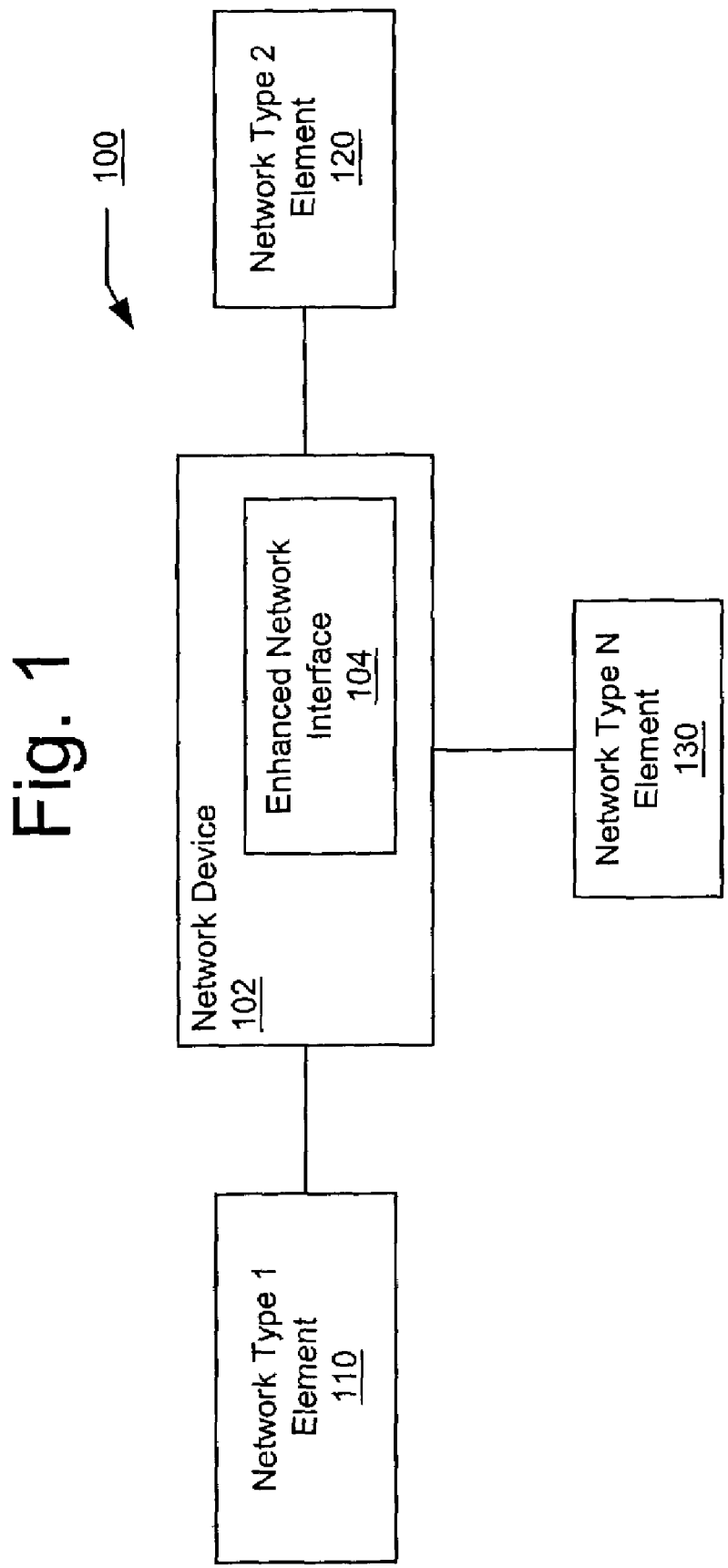
FIG. 1 is a block diagram illustrating an example data network within which embodiments of the invention may be practiced.

FIG. 1 is a block diagram illustrating an example data network within which embodiments of the invention described herein may be practiced. More particularly, in accordance with a first embodiment 100, network type 1 element 110, network type 2 element 120 through network type N element 130 (where N represents any number of network architectures) are coupled with a network device 102. There is no requirement or restriction regarding the number of network architectures or the number of network elements that may be coupled with network device 102. As shown, FIG. 1 depicts network device 102 as comprising an enhanced network interface (ENI) 104 incorporating a dynamically adaptable communications processor (DACP) in accordance with one example implementation of the invention. As described in more detail below, the DACP reconfigures itself to process data packets in accordance with a communication protocol associated with a selected one of a number of channels corresponding to any number of network architectures type 1, type 2, through type N.

As used herein, each of network type 1 element 110, network type 2 element 120 through network type N element 130 may represent a wide variety of network elements known in the art such as, e.g., a desktop computing platform, a notebook computing platform, a handheld device (e.g., a personal digital assistant), a mobile communications device, and the like. In addition, each of network type 1 element 210, network type 2 element 120 through network type N element 130 may represent a wide variety of network devices known in the art such as, e.g., hubs, routers, switches, and the like, that may or may not include the teachings of the embodiments of the invention. Network type 1 element 110, network type 2 element 120 through network type N element 130 are intended to represent such conventional devices currently known in the art. Accordingly, the architectural details of network type 1 element 110, network type 2 element 120 through network type N element 130 need not be described further.

As used herein, but for the integration of ENI 104 incorporating a DACP as described more fully below, network device 102 is intended to represent any of a number of network management devices (hub, switch, router, etc.). Accordingly, the architectural details of network device 102, other than ENI 104, need not be described further.

Example Network Interface with Dynamically Adaptable Communications Processor

Figure 2:
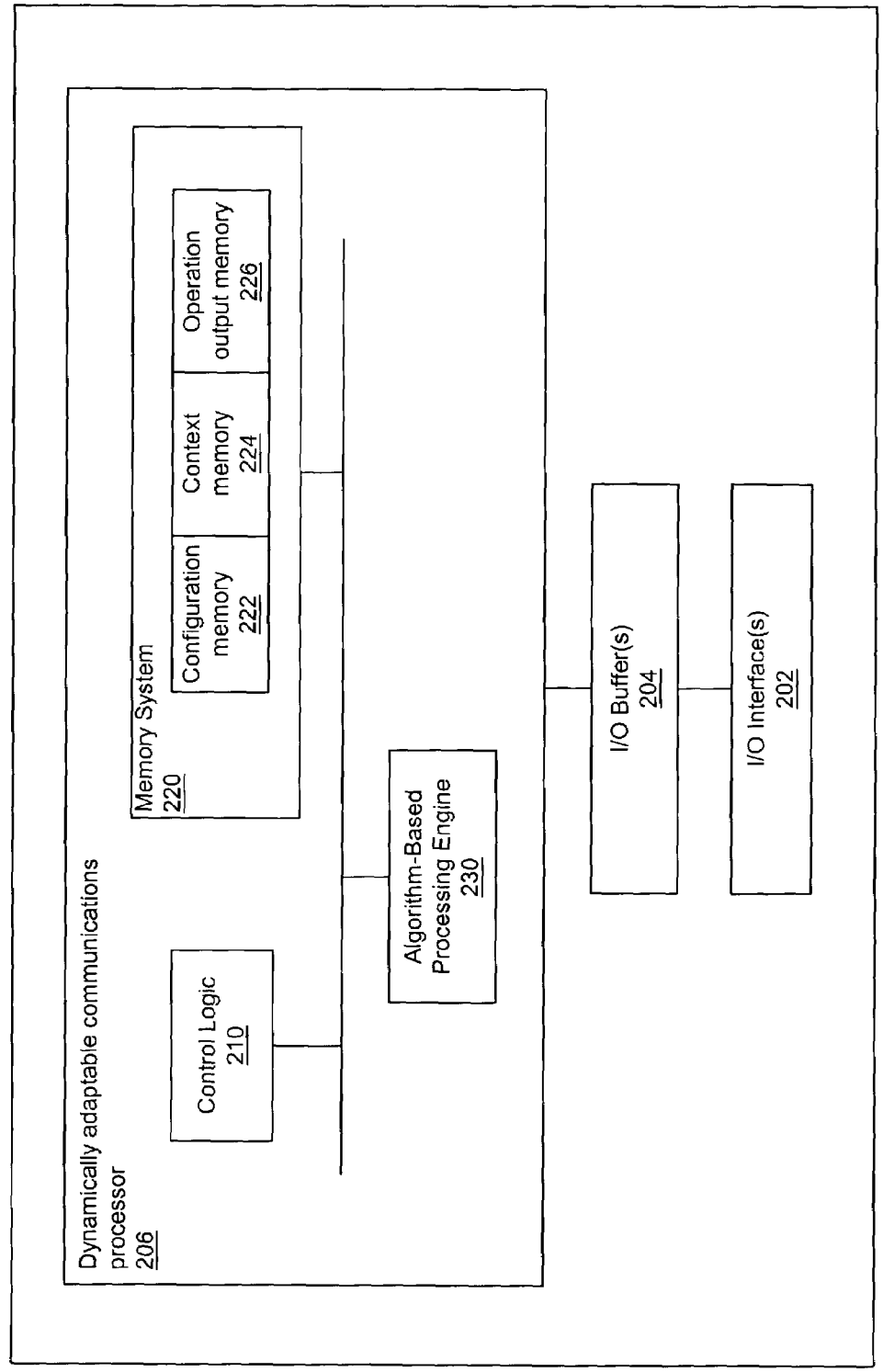
FIG. 2 is a block diagram illustrating one example embodiment of a dynamically adaptable communications processor architecture in accordance with the teachings of an embodiment of the invention.

FIG. 2 is a block diagram illustrating one example embodiment of a dynamically adaptable communications processor architecture in accordance with the teachings of an embodiment of the invention. FIG. 2 provides a simplified block diagram of an example network interface incorporating the dynamically adaptable communications processor (DACP) of the present invention. In accordance with the example embodiment of FIG. 2, ENI 200 (e.g., ENI 104) generally comprises I/O interface(s) 202, I/O buffers 204 and one or more DACPs 206 to dynamically communicate information among elements associated with any of a number of network types.

I/O interface(s) 202 are intended to represent a wide variety of hardware and software used to connect a network device with a communication channel. I/O buffer(s) 204 are intended to represent any of a wide variety of memory systems known in the art. According to one implementation, I/O buffer(s) 204 include receive data structure(s), or queues, and transmit data structure(s). According to one example implementation, network device 102 receives data packets from network type 1 element 110, network type 2 element 120 through network type N element 130 via I/O interface(s) 202, and such data packets are stored in receive queues of I/O buffer(s) 204. DACP 206 receives data packets from the receive queues, processes the data packets, and transmits processed data packets to the transmit queues for transmission to another network type 1 element 110, network type 2 element 120 through network type N element 130. It will be appreciated by those skilled in the art that I/O buffer(s) 204 may be comprised of any of a number of many different types of physical memory/storage devices.

DACP 206 is depicted comprising control logic 210, memory system 220 and algorithm-based processing engine 230. Those skilled in the art will appreciate that memory system 220 may be located outside of DACP 206, and that memory system 220 may be coupled with ENI 200 or network device 102. Although depicted as a number of disparate functional items, those skilled in the art will appreciate that one or more of such elements may well be combined into single functional entities. Alternatively, certain elements may be split into multiple functional elements.

Control logic 210 controls the dynamic adaptability aspect of DACP 206. In this regard, control logic 210 determines a communication protocol associated with a selected one of a number of channels coupled with ENI 200 supplying a data packet. In accordance with one aspect of the invention, developed more fully below, having identified the communication protocol, control logic 210 retrieves configuration information corresponding to the communication protocol and configures DACP 206 to process the received data packet in accordance with the identified channel.

In connection with processing the data packet, control logic 210 invokes an instance of algorithm-based processing engine 230. According to one aspect of the invention, developed more fully below, algorithm-based processing engine 230 performs operations on the content of data packets and selects outputs from the operations in order to generate a processing parameter in accordance with the configuration of DACP 206.

Control logic 210 is intended to represent any of a wide variety of control logic known in the art such as, for example, microprocessor(s), microcontroller(s), programmable logic device(s) (PLD), field programmable gate arrays (FPGA), state machine(s) and the like. Alternatively, control logic 210 may well be content (e.g., executable instructions) which, when executed by a computing appliance, implement the control features described herein.

Memory system 220 is depicted comprising configuration memory 222, context memory 224 and operation output memory 226. As used herein, memory system 220 is intended to represent any of a wide variety of memory systems known in the art. Those skilled in the art will appreciate that memory system 220 may well be comprised of any of a number of many different types of physical memory/storage devices.

Configuration memory 222 includes configuration information for a wide variety of disparate communication protocols, including, e.g., asynchronous transfer mode (ATM), packet over synchronous optical network (POS) and generic framing procedure (GFP). While the details of such communication protocols are not required to appreciate the teachings of embodiments of the invention, for a more complete understanding of such communication protocols, the reader is directed to, e.g., International Telecommunications Union Telecommunication Standardization Sector (ITU-T), Recommendation I.432.5, "B-ISDN User-Network Interface—Physical Layer Specification: 25 600 Kbit/s Operation," June 1997; Internet Engineering Task Force, Network Working Group Request for Comments 2615, "PPP over SONET and SDH," June 1999; ITU-T, Recommendation G.7041/Y.1303, "Generic Framing Procedure (GFP)," December 2001. Such references are incorporated herein by reference for all purposes.

According to one example implementation, each entry of configuration memory 222 is associated with a particular communication protocol. As will be discussed more fully below, control logic 210, having determined the communication protocol associated with a channel supplying a data packet, accesses configuration memory 222, retrieves configuration information corresponding to the communication protocol and configures DACP 206 to process the data packet.

Context memory 224 includes data corresponding to previously processed portions of a data packet. According to one example implementation, each entry of context memory 224 is associated with a portion of a previously processed data packet received from a channel. As will be discussed more fully below, control logic 210 reads context data from context memory 224 in connection with processing a data packet, part of which has been previously processed. In addition, as will be discussed more fully below, control logic 210 stores processed portions of a data packet in context memory 224 when control logic 210 reconfigures DACP 206 in connection with receiving a new data packet from a different channel.

Operation output memory 226 includes output from operations performed on the content (e.g., bits, bytes, words, etc.) of data packets. According to one example implementation, each entry of operation output memory 226 comprises the output of an operation, such as an XOR operation. As will be discussed more fully below, algorithm-based processing engine 230 retrieves from operation output memory 226 outputs associated with an algorithm for generating a processing parameter, in accordance with the configuration of DACP 206.

Example Data Structure(s)

Figure 3:
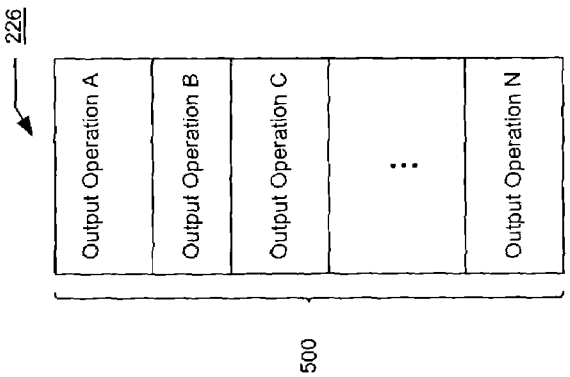
FIG. 3 is a graphical illustration of one example embodiment of configuration memory in accordance with the teachings of an embodiment of the invention.

FIG. 3 is a graphical illustration of one example embodiment of configuration memory 222 in accordance with the teachings of an embodiment of the invention. In accordance with the illustrated example of FIG. 3, configuration memory 222 is depicted comprising a plurality of entries 300, wherein each entry is associated with a type of communication protocol, e.g., communication protocol type 1, communication protocol type 2, communication protocol type 3, through communication protocol type N (where N denotes the number of communication protocols supported by DACP 206, wherein such communication protocols correspond to a plurality of types of network architectures).

According to one example implementation, one of the entries 300 represents POS, another represents ATM and another represents GFP. In accordance with the teachings of an embodiment of the invention, when receiving a data packet from a channel, control logic 210 retrieves from an entry 300 configuration information corresponding to the communication protocol associated with the channel supplying the data packet. As will be developed more fully below, control logic 210 uses the configuration information to reconfigure DACP 206 into a communications processor of the type associated with the communication protocol.

Figure 4:
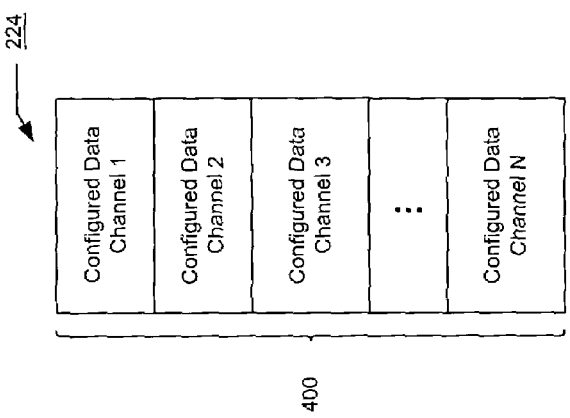
FIG. 4 is a graphical illustration of one example embodiment of context memory in accordance with the teachings of an embodiment of the invention.

FIG. 4 is a graphical illustration of one example embodiment of context memory 224 in accordance with the teachings of an embodiment of the invention. In accordance with the illustrated example implementation of FIG. 4, context memory 224 is depicted comprising a plurality of entries 400, wherein each entry is associated with a channel that uses a particular communication protocol to transmit data packets. According to one example implementation, each of the entries 400 comprises previously processed portions of a data packet received from a channel.

As will be developed more fully below, when DACP 206 receives a data packet from a channel via I/O interface(s) 202 and I/O buffer(s) 204, control logic 210 reads an entry 400 comprising previously processed portions of the data packet. When DACP 206 receives a new data packet from a different channel, control logic 210 stores processed portions of the data packet in an entry 400 and retrieves context data regarding the new data packet. Context data determines the point at which control logic 210 previously stopped processing the data packet, only a portion of which was processed during the processing time (e.g., the amount of bandwidth) assigned to one or more channels providing the portions of the data packet.

Figure 5:
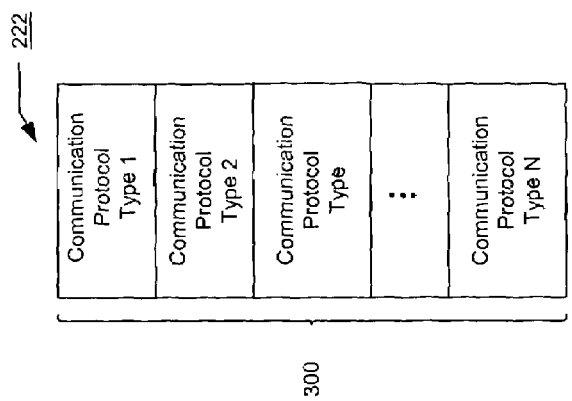
FIG. 5 is a graphical illustration of one example embodiment of operation output memory in accordance with the teachings of an embodiment of the invention.

FIG. 5 is a graphical illustration of one example embodiment of operation output memory 226 in accordance with the teachings of an embodiment of the invention. In accordance with the illustrated example implementation of FIG. 5, operation output memory 226 is depicted comprising a plurality of entries 500, wherein each entry is associated with an output from the execution of operations performed on the content of a data packet being processed. According to one example implementation, each of the entries 500 comprises outputs of XOR operations performed on the content of a data packet. As will be developed more fully below, in connection with processing a data packet, algorithm-based processing engine 230 performs an operation on the content of the packet, stores the outputs in operation output memory 226 and selects outputs in accordance with algorithms used to generate processing parameters in according with the configuration of DACP 206.

Example Operation and Implementation

Figure 7:
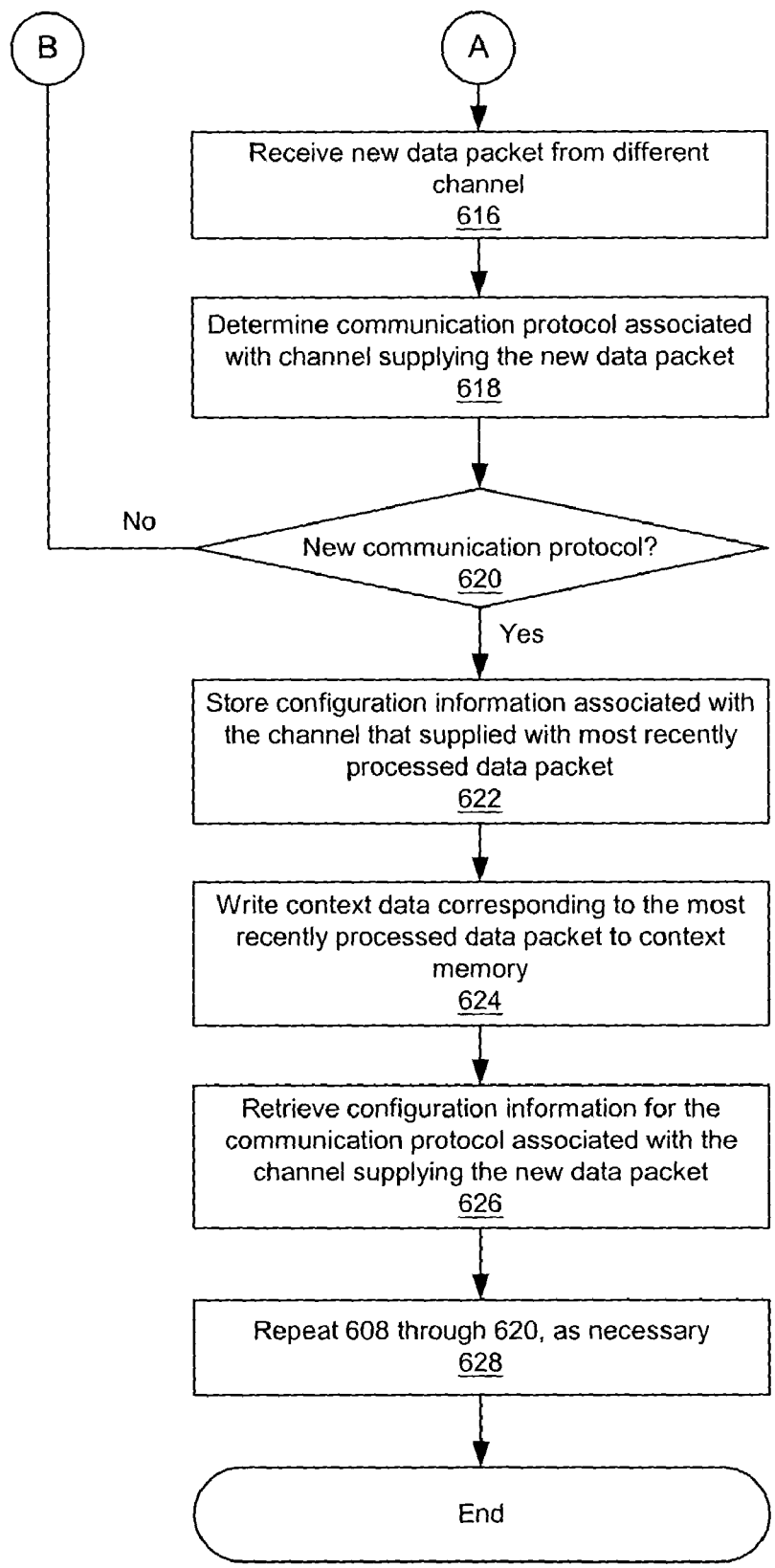

Having introduced the operating environment and architectural elements of the invention above, attention is now directed to FIG. 6 and FIG. 7, wherein an example implementation of a DACP is presented in greater detail. For ease of illustration, and not limitation, the methods of FIG. 6 and FIG. 7 will be developed with continued references to FIGS. 1–5, as appropriate. Nonetheless, it is to be appreciate that the teachings of FIG. 6 and FIG. 7 may well be implemented in alternate network architectures/configurations without deviating from the spirit and scope of the invention.

FIG. 6 and FIG. 7 are a flow chart illustrating one example embodiment of a method of a communications processor dynamically adapting to any of a plurality of different communication protocols, in accordance with the teachings of an embodiment of the invention.

According to the illustrated example implementation of FIG. 6 and FIG. 7, at block 602 of the method 600, network device 102 receives a data packet from a channel via I/O interface(s) 202 and a receive buffer of I/O buffer(s) 204. At block 604, control logic 210 determines the communication protocol associated with the channel.

At block 606, control logic 210 retrieves configuration information corresponding to the communication protocol associated with the channel. According to one example implementation, control logic 210 retrieves configuration information from configuration memory 222. At block 608, control logic 210 utilizes the configuration information to configure DACP 206 to process data packets in accordance with the communication protocol associated with the channel from which the data packet is received.

At block 610, control logic 210 reads context data corresponding to the previously processed portion of the data packet. According to one example implementation, control logic 210 reads context data from context memory 224. Those skilled in the art will appreciate that if no part of the data packet has been previously processed, control logic 210 does not read context data in connection with processing the data packet.

At block 612, control logic 210 processes the data packet in accordance with the configuration of DACP 206. According to one example implementation, control logic 210 processes the data packet by adding the network addresses of a transmitting network element and of a destination network element, and by inserting idlers in the data packet. Those skilled in the art will appreciate that processing a data packet may involve different, fewer or additional processing operations. In an example embodiment, control logic 210 processes the data packet for a period corresponding to the amount of bandwidth assigned to the channel supplying the data packet.

In accordance with one example embodiment, control logic 210 invokes an instance of algorithm-based processing engine 230 in connection with processing the data packet. Algorithm-based processing engine 230 generates a processing parameter based an algorithm associated with the communication protocol for which DACP 206 is configured to process data packets. In one example implementation, algorithm-based processing engine 230 generates a processing parameter comprising a cyclic redundancy check (CRC). As is known in the art, a CRC determines whether a data packet contains errors. In another example implementation, algorithm-based processing engine 230 generates a processing parameter comprising a scrambling parameter. As is known in the art, a scrambling parameter provides density of transmission of a data packet. Those skilled in the art will appreciate that the processing parameter may comprise any of a plurality of parameters generated in connection with processing a packet.

In accordance with one aspect of an example embodiment, algorithm-based processing engine 230 performs operations on the content of the data packet, e.g., an XOR operation. As is readily understood by one of ordinary skill in the art, algorithm-based processing engine 230 may perform the operations on the content either in series or in parallel without deviating from the spirit and scope of embodiments of the invention. According to another aspect of the example embodiment, algorithm-based processing engine 230 stores the output resulting from each operation in operation output memory 226.

According to another aspect of the example embodiment, algorithm-based processing engine 230 retrieves selected outputs from operation output memory 226 in accordance with the algorithm associated with the processing parameter being generated and the communication protocol for which DACP 206 is configured to process data packets. For example, if algorithm-based processing engine 230 is generating a CRC when DACP 206 is configured to process data packets received from a POS channel, the algorithm for generating the CRC is $x^{43}+1$. Having performed an XOR operation by passing the content of the data packet through flip-flop gates and having stored the outputs, algorithm-based processing engine 230 retrieves from operation output memory 226 the output of the $43^{rd}$ flip-flop gate in order to generate the CRC. Similarly, for example, if algorithm-based processing engine 230 is generating a CRC when DACP 206 is configured to process data packets received from a GFP channel, the algorithm is $x^{16}+x^{12}+x^5+1$. Accordingly, in order to generate the CRC, algorithm-based processing engine 230 retrieves from operation output memory 226 the outputs of the $16^{th}$, $12^{th}$ and $5^{th}$ flip-flop gates.

Continuing with method 600, at block 614, control logic 210 transmits the processed data packet to a transmit buffer of I/O buffers 204. At block 616, DACP 206 receives a new data packet from a different channel. At block 618, control logic 210 determines the communication protocol associated with the channel supplying the new data packet. At block 620, control logic 210 determines whether the communication protocol associated with channel supplying the new data packet is the same as the communication protocol associated with the channel that supplied the most recently processed data packet.

If control logic 210 determines that the communication protocol associated with the channel supplying the new data packet is the same as the communication protocol associated with the channel that supplied the most recently processed data packet, method 600 continues in accordance with blocks 610 through 620.

Conversely, if control logic 210 determines that the communication protocol associated with the channel supplying the new data packet is different, at block 622, control logic 210 stores in configuration memory 222 configuration information associated with the channel that supplied the most recently processed data packet. At block 624, control logic 210 stores in context memory 224 any context data corresponding to processed portions of the most recently processed data packet. At block 626, control logic 210 retrieves configuration information corresponding to the communication protocol associated with the channel supplying the new data packet. At block 628, method 600 repeats blocks 608 through 620, as necessary.

Alternate Embodiment(s)

Figure 8:
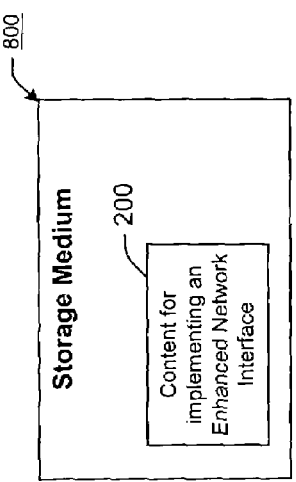
FIG. 8 is a block diagram illustrating one example embodiment of a storage medium comprising a plurality of executable instructions which, when executed, cause an accessing machine to implement one or more aspects of the innovative dynamically adaptable communications processor of the invention, in accordance with an alternate embodiment of the invention.

FIG. 8 is a block diagram of one example embodiment of a storage medium comprising a plurality of executable instructions which, when executed, cause an accessing machine to implement one or more aspects of the innovative dynamically adaptable communications processor mechanism of the invention. In this regard, storage medium 800 includes content for a communications processor implementing the dynamic adaptability features of an embodiment of the invention, in accordance with an alternate embodiment of the invention.

In the description above, for the purposes of explanation, numerous specific details are set forth in order to provide a thorough understanding of embodiments of the invention. It will be apparent, however, to one skilled in the art that the embodiments of the invention may be practiced without some of these specific details. In other instances, well-known structures and devices are shown in block diagram form.

FIG. 6, FIG. 7 and FIG. 8 describe embodiments of the invention in terms of methods. The methods of the embodiments of the invention may be performed by hardware components, such as those shown in FIGS. 1–5, or may be embodied in machine-executable instructions, which may be used to cause a general-purpose or special-purpose processor or logic circuits programmed with the instructions to perform the steps. Alternatively, the methods may be performed by a combination of hardware and software. Moreover, although the invention has been described in the context of a network interface device, those skilled in the art will appreciate that such functionality may well be embodied in any of number of alternate embodiments such as, for example, integrated within a computing device, and is readily adapted to wireless or wired implementations.

Embodiments of the invention may be provided as a computer program product which may include a machine-readable medium having stored thereon instructions which may be used to program an electronic device (such as a personal computer) to perform a process according to the embodiments of the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the embodiments of the invention may also be downloaded as a computer program product, wherein the program may be transferred from a remote computer to a requesting computer by way of data signals embodied in a carrier wave or other propagation medium via a communication link (e.g., a modem or network connection).

In the foregoing specification, the invention has been described with reference to specific embodiments thereof. It will, however, be evident that various modifications and changes can be made thereto without departing from the broader spirit and scope of the invention. The specification and drawings are, accordingly, are to be regarded in an illustrative rather than a restrictive sense. i.e., the particular embodiments are not provided to limit the invention but to illustrate it. The scope of the embodiments of the invention is not to be determined by the specific examples provided above but only by the claims below.

What is claimed is:

1. An apparatus comprising:
    a configuration memory to store configuration information for a plurality of different communication protocols selected from asynchronous transfer mode (ATM), packet-over-synchronous optical network (POS), and generic framing procedure (GFP);
    control logic to determine a communication protocol associated with a data packet received over a communication channel, and retrieve configuration information corresponding to the determined communication protocol from the configuration memory; and
    a dynamically configurable processing engine to process the data packets based on the configuration information; and
    a context memory, wherein the control logic is further to store context data associated with a processed portion of the data packet after the processing of the data packet has stopped, and wherein the control logic is to retrieve the context data and process an unprocessed portion of the data packet using the configured processing engine.

2. The apparatus of claim 1, wherein the configuration information comprises cyclic redundancy check (CRC) algorithm configuration information.

3. The apparatus of claim 1, wherein the configuration information comprises scrambling algorithm configuration information.

4. The apparatus of claim 1, wherein the processing engine comprises an algorithm-based processing engine.

5. The apparatus of claim 1, further comprising an operation output memory to store outputs of operations performed by the processing engine on content of the data packet.

6. A method comprising:
    receiving a data packet from a communication channel;
    determining a communication protocol associated with the communication channel;
    retrieving configuration information corresponding to the determined communication protocol from a configuration memory;
    dynamically configuring a communications processor using the retrieved configuration information;
    processing the data packet using the configured communications processor;
    storing context data associated with a processed portion of the data packet, wherein the processing of the data packet was stooped when another data packet was received from a different communication channel associated with a different communication protocol; retrieving the context data; and
    processing an unprocessed portion of the data packet using the configured communications processor.

7. The method of claim 6, wherein said retrieving the configuration information from the configuration memory comprises retrieving the configuration information from a configuration memory that stores configuration information for a plurality of disparate types of network architectures.

8. The method of claim 6, wherein said retrieving the configuration information train the configuration memory comprises retrieving the configuration information from a configuration memory that stores configuration information for at least asynchronous transfer mode (ATM), packet-over-synchronous optical network (POS), and generic framing procedure (GFP) protocols.

9. The method of claim 6, wherein said retrieving the configuration information comprises retrieving cyclic redundancy check (CRC) algorithm configuration information.

10. The method of claim 6, wherein said retrieving the configuration information comprises retrieving scrambling algorithm configuration information.

11. The method of claim 6, wherein the processing includes generating a processing parameter based on an algorithm associated with the determined communication protocol, performing operations on content of the data packet, storing outputs resulting from the operations, and retrieving one or more selected outputs based at least in part on the algorithm associated with the processing parameter.

12. The method of claim 6, wherein processing comprises invoking an instance of an algorithm-based processing engine.

13. An article of manufacture comprising:
    a machine accessible medium including content that when accessed by a machine causes the machine to perform operations comprising:
    determining a communication protocol associated with a communication channel over which a packet is received;
    retrieving configuration information corresponding to the determined communication protocol from a configuration memory; and
    dynamically configuring a communications processor using the retrieved configuration information;
    storing context data associated with a processed portion of the packet, wherein the processing of the packet was stopped when another packet was received from a different communication channel associated with a different communication protocol;
    retrieving the context data; and
    processing an unprocessed portion of the data packet using the configured communications processor.

14. The article of manufacture of claim 13, wherein the content that causes the machine to retrieve the configuration information from the configuration memory further including content that causes the machine to perform operations comprising:
    retrieving the configuration information from a configuration memory that stores configuration information for at least asynchronous transfer mode (ATM), packet-over-synchronous optical network (POS), and generic framing procedure (GFP) protocols.

15. The article of manufacture of claim 13, wherein the content that causes the machine to retrieve the configuration information from the configuration memory further including content tat causes the machine to perform operations comprising:
    retrieving configuration information selected from cyclic redundancy check (CRC) algorithm configuration information, scrambling algorithm configuration information, and a combination thereof.

16. The article of manufacture of claim 13, wherein the content that causes the machine to process the data packet further including content that causes the machine to perform operations comprising:

generating a processing parameter based on an algorithm associated wit the determined communication protocol;

performing operations on content of the data packet;

storing outputs resulting from the operations; and retrieving one or more selected outputs based at least in part on the algorithm associated with the processing parameter.

* * * * *

UNITED STATES PATENT AND TRADEMARK OFFICE
CERTIFICATE OF CORRECTION

PATENT NO. : 7,243,154 B2
APPLICATION NO. : 10/186028
DATED : July 10, 2007
INVENTOR(S) : Feuerstraeter It is certified that error appears in the above-identified patent and that said Letters Patent is hereby corrected as shown below:

In column 3, at line 12, delete "210" and insert --110--.

In column 9, at line 62, delete "stooped" and insert --stopped--.

In column 10, at line 7, delete "train" and insert --from--.

In column 11, at line 6, delete "wit" and insert --with--.

Signed and Sealed this

Tenth Day of June, 2008

JON W. DUDAS
*Director of the United States Patent and Trademark Office*